Patented June 5, 1945

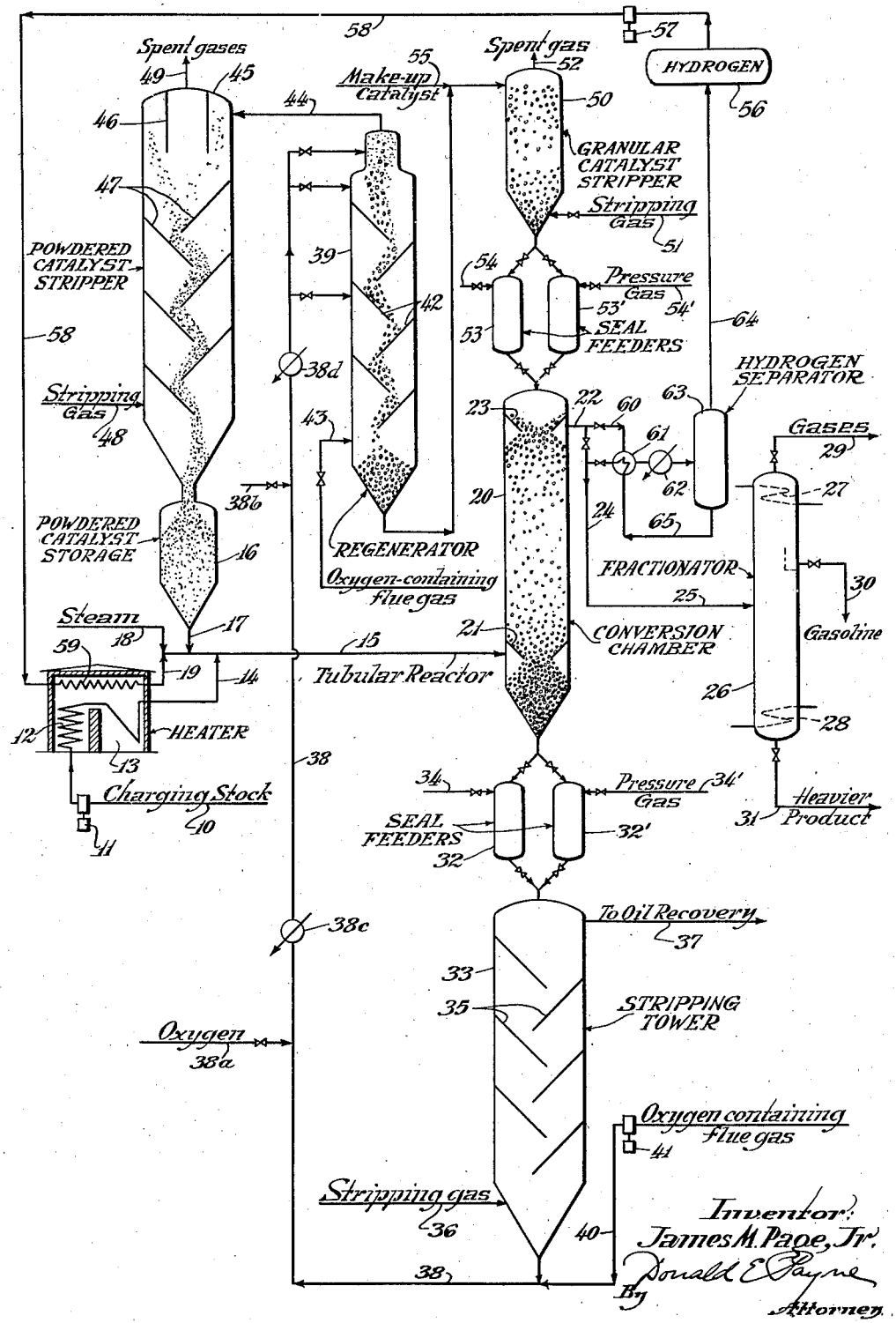

2,377,513

UNITED STATES PATENT OFFICE 2,377,513

COMBINATION POWDERED - GRANULAR CATALYST HYDROCARBON CONVERSION SYSTEM

James M. Page, Jr., Chicago, Ill., assignor to Standard Oil Company, Chicago, Ill., a corporation of Indiana Original application December 19, 1939, Serial No. 310,010. Divided and this application December 5, 1941, Serial No. 421,760

9 Claims. (Cl. 196—52)

This invention relates to the catalytic conversion of hydrocarbons into high quality motor fuel and it pertains particularly to an improved method and means for effecting the regeneration of powdered and granular catalysts. This is a division of my co-pending application Serial No. 310,010.

There are at least three distinct types of systems for effecting catalytic conversion of hydrocarbons: (1) the stationary type which comprises a fixed catalyst bed through which gases or vapors flow; (2) the moving bed type which comprises means for continuously or intermittently introducing and withdrawing catalyst from a reaction chamber during the course of the reaction, and (3) the catalyst suspension type wherein powdered catalyst is carried through the system suspended in the gases or vapors undergoing treatment. Each of these systems is characterized by certain advantages and certain disadvantages, both with respect to cost and facility of operation and with respect to yields and properties of products produced.

One of the chief objections to moving bed catalyst systems is the large amount of catalyst lost as "fines" which inevitably result from the abrasion, crushing, etc. incident to the transfer of catalyst material through the conversion chambers, strippers, regeneration systems, conveyors, etc. Since catalyst material is expensive it is essential for commercial success that catalyst losses be reduced to a minimum.

Suspended catalyst systems employ catalyst material of such fine particle size that considerable difficulty has been encountered in separating the catalyst from reaction products. Furthermore, the suspended catalyst systems are necessarily concurrent in operation and such systems therefore lack the advantages obtainable by countercurrent flow of hydrocarbon vapors and catalyst. An object of my invention is to provide a combination of moving bed and suspended catalyst systems wherein the disadvantages of both systems will be practically eliminated and the advantages of both systems will be obtained.

A further object of the invention is to obtain a better product distribution than has heretofore been obtainable in catalytic conversion systems used for the production of high quality motor fuel. In catalytic cracking, for instance, it has been found that powdered catalyst operations give a product which contains relatively large amounts of olefins and relatively small amounts of aromatics. Fixed or moving bed systems, on the other hand, tend to produce more aromatics and a lesser amount of unsaturates or olefins. A high olefin content is objectionable because of its tendency to polymerize to form gums, etc. and because of its low susceptibility to anti-knock agents such as lead tetraethyl. Aromatics, particularly benzol, are objectionable in certain fuels such as aviation fuels because of low total heat content. An object of my invention is to produce a motor fuel of good lead tetraethyl susceptibility and of high total heat content. A further object is to produce a balanced motor fuel containing large amounts of isoparaffins. A still further object is to obtain maximum yields of hydrocarbons in the gasoline boiling range with minimum losses to gas, coke, etc.

In certain reactions, particularly reforming, or aromatization, it is essential to have a relatively large catalyst-to-oil ratio. It is difficult, if not impossible, to obtain this desired ratio in a once-through powdered catalyst system because the oil vapors will not suspend and carry through the reactor the necessary amount of catalyst. An object of my invention is to provide a method and means for increasing the effective catalyst-to-oil ratio in the powdered catalyst system. A further object is to provide a "soaking" section in a powdered catalyst system which will permit complete expenditure of the powdered catalyst activity.

A further object of the invention is to provide a unitary system for employing both granular and powdered catalyst and for simultaneously stripping and regenerating both powdered and granular catalyst while they are associated with each other. A further object is to provide a method and means whereby either the powdered catalyst or the granular catalyst or both may be only partially regenerated; by leaving a small amount of carbon on the catalyst I may effect savings in the expense of regeneration, i. e., avoid the cost of complete regeneration and at the same time obtain regenerated catalyst of satisfactory activity for one or both stages of the process. A further object is effectively to utilize the fine material resulting from attrition of granular catalyst without the necessity of repelleting.

A further object is to provide a catalytic conversion system of maximum flexibility, i. e., one in which the character of conversion may be varied over wide ranges depending on the amount and type of granular and powdered catalyst, respectively, and the operating conditions employed for these respective catalysts. For instances, in an aromatization process the dehydrogenation may be effected chiefly by the preliminary contact with powdered catalyst and the olefins thus produced may be cyclicized in the moving bed system. Other objects of the invention will be apparent from the following detailed description.

In practicing my invention a powdered catalyst is suspended in hot hydrocarbon vapors and passed concurrently therewith through a transfer line or primary conversion zone to the base of a moving bed granular catalyst conversion chamber. As the hot vapors together with suspended powdered catalyst pass upwardly through the moving granular catalyst bed the powdered catalyst material is effectively filtered out of the gases and vapors so that the gases leaving the upper part of the granular catalyst conversion chamber are substantially free from catalyst. Occluded oil is then removed from the mixture of spent granular and powdered catalysts and the spent catalysts are simultaneously regenerated in a closed conduit which also acts as a conveyor. This conveyor discharges into a secondary regenerator to complete the regeneration of granular catalyst material and to complete the removal of suspended powdered catalyst therefrom. The powdered catalyst is recovered from regeneration and stripping gases by pneumatic classifying means such as a cyclone separator and after removal of regeneration gases it is reintroduced into the cycle. Similarly, the granular catalyst is freed from regeneration gases and returned to the top of the moving bed conversion system.

Hydrogen may be employed in the conversion step and said hydrogen not only serves to minimize coke deposition but serves to supply additional reaction heat and additional conveying means for the powdered catalyst. Any dust or fines produced by attrition or abrasion as the granular catalyst flows through the system is recovered along with the powdered catalyst and acts as make-up catalyst in this portion of the system. Thus catalyst losses are reduced to a minimum and only very small amounts of make-up granular catalyst are required.

A preferred embodiment of the invention is illustrated in the accompanying drawing which is a schematic flow diagram of my improved catalytic conversion system.

The invention is applicable to a wide variety of petroleum conversion processes such as cracking, isomerization, reforming, dehydrogenation, aromatization, desulfurization, alkylation, polymerization, etc. Catalysts, charging stocks and operating conditions will necessarily depend on the particular process and the nature of the desired products. Generally speaking, any type of hydrocarbon charging stock may be employed, gases may be dehydrogenated, polymerized, alkylated, etc. Naphthas may be isomerized, dehydrogenated, reformed, aromatized, etc. Gas oils and heavier hydrocarbons may be cracked or destructively hydrogenated and in such reaction many of the other reactions hereinabove enumerated will also take place. The charging stocks may be petroleum or petroleum fractions of any kind or source or oil produced from coal, shale and other organic materials or produced by the hydrogenation of organic materials or produced by synthesis such for example as the carbon monoxide-hydrogen synthesis of the so-called Fischer-Tropsch process. In the preferred examples I will describe the use of an East Texas gas oil for the catalytic cracking and an East Texas naphtha for the catalytic reforming, but it should be understood that oils from any other source may be used as charging stocks.

The nature of the catalyst will, of course, vary with the type of process used. For cracking I prefer to employ catalyst material comprising a metal oxide, i. e., catalysts of the silica-alumina type or of the type wherein metal oxide is deposited on silica. Activated natural clays such as acid treated bentonite (Super Filtrol) is an example of the so-called natural catalysts of the clay type. Synthetic catalysts may be prepared by co-precipitating silica gel with a metal oxide, impregnating silica gel with mineral salts which on drying and heating are converted into metal oxides or hydrolytically adsorbing metal oxides on the silica gel support. The metal oxides deposited on the silica gel or on activated clay may be one or more oxides of such metals as aluminum, magnesium, thorium, titanium, zirconium, beryllium, cerium, copper, nickel, manganese, etc. Such catalysts and their methods of preparation are known to the art and need no further description.

For dehydrogenation, reforming or aromatization I prefer to employ group VI metal oxides mounted on active alumina. About 2% to 6% molybdenum oxide on alumina or about 5% to 15% of chromium oxide on alumina are highly satisfactory but it should be understood that oxides of tungsten, uranium, vanadium, cerium, etc. may likewise be used. The oxides may be mounted by impregnation or adsorption. Since the specific catalysts and methods of preparing them are well-known no further description thereof is necessary. Bauxite or activated clays may be employed for desulfurization or isomerization. Copper pyro-phosphate or phosphoric acid impregnated on kieselguhr may be employed for polymerization. These and many other catalysts and catalytic mixtures are well-known to those skilled in the art.

The catalyst in my system is used in two distinct forms, a granular form and a powdered form. By the term "granular catalyst" I mean to include not only the granules or fragments of natural or synthetic origin but I also include pellets, extruded masses and particles which have been preformed by any other process. The particle size in the case of granular catalysts may vary considerably but is preferably smaller than quarter inch and larger than 100 mesh (although it may be as small as 400 mesh) and is fairly uniform in particle size. The powdered catalyst, as the name implies, is of relatively small particle size, i. e., sufficiently small to permit suspension in a vapor stream of reasonably high velocity. I prefer to employ catalyst sizes below 100 mesh and even below 400 mesh but it will be understood that larger sizes may be employed, depending somewhat upon the nature, physical form and density of the catalyst material itself. A feature of the invention is the pneumatic classification of catalyst which automatically separates the granular from the powdered components; powdered components which are separated pneumatically may, of course, be suspended in oil vapors.

When my invention is utilized for catalytic cracking the gas oil charging stock is introduced through line 10 by pump 11, coils 12 of pipe still 13 and thence by transfer line 14 to tubular reactor 15. Powdered catalyst from storage tank 16 is introduced through line 17 (which may be provided with a suitable pressure feeding mechanism) into tubular reactor 15 and it may be dispersed into the tubular reactor by means of steam or other gas introduced through lines 18 or 19. The vapors and suspended catalyst material in tubular reactor 15 are preferably at a temperature of about 750 to 1050° F., for example about 900° F. and are at a pressure which may range from about atmospheric to 200 pounds per square inch, for example about 25 to 75 pounds per square inch. The velocity of flow through the tubular reactor should be sufficient to maintain the powdered catalyst in suspension and the weight ratio of catalyst to oil should be about 0.5 to 15.0, for example about 2 to 2.5. The time of contact in tubular reactor 15 may range from about 1 to 50 seconds, but is preferably about 10 to 25 seconds.

The gases, vapors, reaction products and suspended catalyst are discharged at the base of moving bed granular catalyst conversion chamber 20, preferably in a space between the wall of said chamber and inverted frusto-conical baffle 21. Conversion chamber 20 is maintained substantially full of granular catalyst material which continuously or intermittently moves through the conversion chamber from top to bottom. As the gases and vapors move upwardly against the downwardly moving bed of granular catalyst the powdered catalyst material is effectively filtered out of the hydrocarbon vapor stream so that the gases, vapors and products which are removed from the top of the chamber through line 22 contain no catalyst material. Frusto-conical baffle 23 provides an open space from which vaporous products may be withdrawn.

Conversion chamber 20 is preferably maintained at about the same or slightly lower temperature and pressure than tubular reactor 15 and it should be understood that both the reactor and the chamber should be suitably insulated or if desired provided with heating means. In conversion chamber 20 the gases and vapors pass through the granular catalyst at a space velocity of about 0.1 to 10.0 volumes of charging stock (liquid basis) per volume of catalyst space per hour and the catalyst holding time, i. e., the length of time a given particle of catalyst requires to travel through the conversion chamber, may vary from about 0.2 to 20.0 hours. Certain reactions which were initiated in the tubular reactor are completed in the conversion chamber and certain products which are formed in the tubular reactor (for example, olefins) may be converted into more desirable products (for instance aromatics) in the conversion chamber. The combination of tubular reactor and moving bed catalyst conversion system results in the production of hydrocarbons of high anti-knock value, good lead tetraethyl susceptibility, good stability against oxidation, etc. and the combined treatment thereof produces a gasoline of unusually high quality.

The gases and vapors are introduced by line 22 through lines 24 and 25 to a suitable fractionating system 26 which is diagrammatically represented as a tower with a reflux means 27 and reboiler means 28; any conventional system of bubble towers, stabilizers, etc. may be employed for the fractionation step. Gases are withdrawn overhead through line 29, gasoline through line 30 and heavier products through line 31.

The spent catalyst mixture from the base of conversion chamber 20 is alternately withdrawn into one of the sealed feeders 32 and 32', one of said feeders being connected to conversion chamber 20 while the other is discharging into stripping column 33. The alternate feeders are employed because the conversion chamber may be operated at a different pressure than the stripping chamber and it is desirable that gas leakage be prevented between these two chambers. The pressure in feeders 32 and 32' may be controlled by introducing or withdrawing gases therefrom through lines 34 and 34'.

The spent catalyst mixture falls downwardly in stripping column 33 over inclined baffles 35 countercurrent to a hot inert stripping gas such as normally gaseous hydrocarbons, flue gas, steam, etc. introduced at the base of the column through line 36. Column 33 is of relatively large diameter and the flow of stripping gas is sufficiently slow to avoid the carrying away of powdered catalyst through line 37 which leads to a suitable oil recovery system (not shown). Should any powdered catalyst be carried to the oil recovery system it may be separated from the gases or hydrocarbons by filtration, sedimentation or any other conventional means and returned to the system.

During the stripping step the temperature of the mixed powdered and granular materials is preferably maintained above about 750° or 800° F. If the catalyst is cooled to lower temperatures it should be reheated to the kindling point of the carbonaceous material deposited thereon before the regeneration step.

Regeneration of the powdered catalyst and partial regeneration of the granular catalyst is effected in tubular conduit 38 which likewise serves to convey the catalyst material from the stripper to tower 39. A hot flue gas containing small amounts, preferably about 0.5% to 10% of oxygen, is introduced through line 40 by blower 41 and it serves both as a pneumatic conveying means and as a regenerating gas for the spent catalyst. Catalyst material is forced through conduit 38 at a sufficiently high velocity to carry the granular catalyst material as well as the powdered catalyst material to tower 39 and in the course of its flow through this conduit the powdered catalyst may be substantially completely regenerated, i. e., freed from combustible carbonaceous material. Additional oxygen containing gas may be introduced at spaced points 38a, 38b, etc. along conduit 38 which may also be supplied with coolers 38c and 38d. The coolers may heat extraneous fluid such as air, steam, diphenyl, etc. The mixture of granular and powdered catalyst is introduced at high velocity into the top of tower 39. The granular catalyst then drops out of the stream and falls downwardly over inclined baffles 42 countercurrent, if desired, to a stream of additional regenerating gases introduced at the base of tower 39 through line 43. Tower 39 is relatively tall but of narrow cross section and the velocity of gases introduced through line 43 is sufficient to pick up any powdered catalyst and carry it out the line 44 to the top of tower 45 which is provided with a suitable baffle 46 for effecting the separation of powdered catalyst from the supporting gases. Any desired type of pneumatic classifier may be employed for separating the powdered catalyst from the granular catalyst material, I prefer to employ a simple baffled device of the cyclone separator type for separating powdered catalyst from gases and vapors. Instead of completely regenerating the powdered catalyst and partially regenerating the granular catalyst in conduit 38 I may limit the amount of oxygen introduced through lines 40, 38a, etc. to effect only partial regeneration of the powdered catalyst. This expedient is particularly desirable in the case of those catalysts which are initially so extremely active as to cause a degradation of the charging stock when the powdered catalyst is reacted throughout in reactor 15. By leaving a small amount of carbon on the powdered catalyst the initial super-activity may be suppressed and the desired conversion may be obtained in tubular reactor 15 without undue degradation of the charging stock to gases and coke.

Alternatively, the powdered catalyst may be substantially completely regenerated while the granular catalyst is only partially regenerated, i. e., the granular catalyst which is separated from the powdered catalyst may be charged directly to chamber 50 and the regeneration chamber 39 may be unnecessary. This expedient will be useful where the major part of the conversion is effected in reactor 15 and wherein one of the main functions of the granular catalyst bed is to complete the conversion and to separate the powdered catalyst from reaction products.

Powdered catalyst falls downwardly in tower 45 over inclined baffles 47 countercurrent to stripping gas which is introduced at the base of the tower through line 46, the amount of stripping gas being sufficiently small to prevent any resuspension of the catalyst material. By the time the catalyst reaches the base of tower 45 for discharge into catalyst chamber 16 it is substantially freed from oxygen. The regeneration and stripping gases are removed from the top of tower 45 through vent line 49. In those cases wherein the regeneration gases do not contain appreciable amounts of oxygen the step of stripping regenerated catalyst may be unnecessary. In fact, positive advantages may be obtained by avoiding this stripping step, particularly where steam, etc. is used as a stripping agent.

Granular catalyst passes from the base of tower 39 through a suitable conduit or conveyor to the top of catalyst chamber 50. In actual practice tower 39 should be placed above chamber 50, although any suitable conveying means may be employed if such arrangement is not convenient. A stripping gas introduced through line 51 removes the oxygen-containing gases from the granular catalyst, the spent stripping gases being removed through line 52. The regeneration operation may be carried out at temperatures of 950° to 1100° F. but preferably not above 1050° F. and preferably under pressure which serves to lower the kindling temperature and reduce the possibility of overheating the catalyst. A pressure of 50–200 pounds per square inch is recommended.

The granular catalyst which has thus been regenerated and stripped and which is preferably maintained at a temperature of about 900° to 950° F. is then alternately charged to one of the feeders 53 and 53', one of said feeders being connected to chamber 50 while the other is discharging catalyst material into conversion chamber 20. Pressuring gas may be applied through lines 54 and 54' to facilitate the introduction of catalyst from the feeders into the conversion chamber. Make-up catalyst may be introduced from time to time through line 55.

From the above description it will be seen that I have combined a concurrent suspended catalyst system with a preferably countercurrent moving bed catalyst system and obtained the advantages of both while avoiding the outstanding disadvantages of both. The fines produced by attrition and abrasion in the moving bed system are automatically recovered by the pneumatic classification means and utilized along with powdered catalyst. The problem of removing powdered catalyst from reaction products has been eliminated since the powdered catalyst is effectively filtered out of the vapors during their passage through the moving bed of granular catalyst. Occluded oil is removed from both powdered and granular catalyst in one and the same stripping tower 33 and in conveyor 38 I effect regeneration of the powdered catalyst simultaneously with the partial regeneration of granular catalyst. Regeneration of granular catalyst is thus partially effected by concurrent flow in line 38 and partially by countercurrent flow in tower 39. Throughout the regeneration system the catalyst is moved in a stream of gases which efficiently insulate each catalyst particle and prevent the development of hot spots. By this system regeneration temperatures can be easily controlled and they are preferably maintained below about 1200° F. although with certain catalysts regeneration temperatures as high as 1400° F. are tolerable. Hydrogen may be used in the cracking step described above in a manner described below.

When the invention is applied to catalytic reforming or aromatization the flow will be generally similar to that hereinabove described but the reaction conditions will be somewhat changed and will preferably include the presence of added or recycled hydrogen. Thus instead of a gas oil I charge a low knock rating naphtha through line 10 and heat it to a temperature of about 800 to 1100° F., preferably about 975° F. Hydrogen from storage tank 56 is introduced by compressor 57 and line 58 to coil 59 in furnace 13 and thence through line 19 for assisting in the dispersion of the powdered catalyst material in tubular reactor 15. This reactor may be maintained at low pressures (atmospheric) in the absence of hydrogen but when hydrogen is thus employed I prefer to maintain a pressure of about 50 to 400 pounds per square inch, for example about 200 pounds per square inch. The catalyst-to-oil ratio will be preferably higher than in the case of catalytic cracking and, for example, may be about 1:1 to 100:1. The injection of the hydrogen provides additional carrying means for suspending the catalyst. Hydrogen is preferably employed at the rate of about ½ to 8 mols per mol of charging stock and is preferably heated to a temperature higher than the temperature to which the naphtha is heated in furnace 13, for example 50° to 100° F. or more. The space velocity in reactor 15 in this case should be about 0.1 to 10.0, for example about 1, volumes of liquid oil charged per hour per volume of actual catalyst material in the reactor at any instant. Space velocity is usually defined as the volume of oil per volume of catalyst space per hour and in this instance the catalyst space is the space which would be occupied by the catalyst in the reactor at any instant if that catalyst were allowed to come to rest and settle in the bottom of the reactor.

The reforming or aromatization conditions in chamber 20 will be substantially the same as for catalytic cracking except for the higher pressure and somewhat higher temperature. The reaction products, however, are not passed through line 24 but are withdrawn through line 60, heat exchanger 61 and cooler 62 to hydrogen separator 63 which is preferably operated at about reaction pressure and at a temperature of about 35° to 100° F. Hydrogen from the separator is passed by line 64 to storage tank 56. Liquids from the base of separator 63 are passed by line 65 and heat exchanger 61 to line 25 and fractionating system 26. It should be understood, of course, that the hydrogen need not be pure but may contain 50% or more of hydrocarbon gases. If hydrogen of higher purity is desired suitable scrubbing or purification means may, of course, be employed.

When the invention is thus applied to reforming or aromatization it may take place in two steps, the dehydrogenation being effected in a tubular reactor, the reaction in the tubular reactor 15 being chiefly dehydrogenation and the reaction in chamber 20 being chiefly ring closure or aromatization. In both of the above examples I have described the use of granular and powdered catalyst, respectively, which are of the same composition. It should be understood, however, that I may employ a powdered cracking catalyst and a granular reforming catalyst in which case the charging stock will be chiefly converted into low boiling hydrocarbons of high olefin content in reactor 15 and will then be largely converted into aromatics in conversion chamber 20. Not only may the nature of the catalysts be different in the powdered and granular systems, respectively, but the relative amounts of the catalyst employed, i. e., catalyst-to-oil ratios, space velocity, etc. may be varied throughout relatively wide ranges as hereinabove noted. In fact, the granular material may be non-catalytic, may simply function as a filter for removing powdered catalyst from gases. The removal of catalyst fines from a gaseous stream by means of a moving bed of granular material is an important feature of the invention, and it may be employed for removing the fines, for instance, in the gases leaving the system through line 49 as well as in conversion reactor 20.

My invention provides an extremely flexible catalytic conversion system which can readily be adapted to the conversion of almost any widely varying charging stocks into high quality motor fuel. While I have described preferred embodiments of my invention it should be understood that I do not limit myself thereto since many modifications and alternatives of the invention will be apparent to those skilled in the art from the above disclosure.

I claim:

1. In a process for catalytically converting hydrocarbons into motor fuel by the use of a mixture of powdered and granular catalyst materials, the method of regenerating spent catalyst which comprises suspending said spent catalyst mixture in oxygen-containing regeneration gas at a temperature of at least 750° F. and pneumatically conveying said suspended mixture through a regeneration zone while simultaneously regenerating powdered catalyst and partially regenerating granular catalyst, separating regenerated powdered catalyst from the partially regenerated granular catalyst, further regenerating the separated granular catalyst and stripping regeneration gases from the regenerated powdered catalyst and regenerated granular catalyst, respectively.

2. The method of claim 1 which includes the step of removing powdered catalyst from granular catalyst in the further regeneration step and combining said removed powdered catalyst with powdered catalyst from said initial separation step.

3. A process for effecting catalytic conversion by the use of both granular and powdered catalyst material which process comprises introducing granular catalyst at the top of a substantially vertical conversion zone and removing spent catalyst from the base of said zone at such a rate as to maintain a moving bed of granular catalyst in said zone, introducing a gasiform charging stock stream together with suspended powdered catalyst at a low point in said conversion zone, passing said stream upwardly in said conversion zone whereby the powdered catalyst is removed from said stream by said bed of granular catalyst, removing reaction products from the upper part of said conversion zone, stripping the mixture of granular and powdered catalyst removed from the base of said conversion zone, suspending the stripped catalyst in oxygen-containing regeneration gas, conveying said catalyst to a high level by means of said regeneration gas while effecting at least partial regeneration of said catalysts, separating powdered catalyst from granular catalyst at said high elevation, effecting further regeneration of granular catalyst after its separation from powdered catalyst, returning said further regenerated granular catalyst to the top of said conversion zone, suspending separated powdered catalyst in a gasiform charging stock stream and passing said last-named suspension through a preliminary conversion zone before introducing it at said low point in said first-named conversion zone.

4. In a process for catalytically converting hydrocarbons into motor fuel by the use of a mixture of powdered and granular materials, the method of regenerating spent catalyst which comprises suspending said spent catalyst mixture in oxygen-containing regeneration gas at a temperature of at least 750° F. and pneumatically conveying said suspended mixture through a regeneration zone while simultaneously effecting partial regeneration of both powdered and granular catalyst, separating the partially regenerated powdered catalyst from the partially regenerated granular catalyst and returning at least one of said partially regenerated catalysts to the reaction system.

5. The method of claim 4 which includes the step of further regenerating the granular catalyst after its separation from the powdered catalyst.

6. In a process for catalytically converting hydrocarbons into motor fuel by the use of a mixture of powdered and granular catalyst materials, the method of regenerating spent catalyst which comprises suspending the spent catalyst mixture in oxygen-containing regeneration gas at a temperature of at least 750° F. and pneumatically conveying said suspended mixture through a regeneration zone while simultaneously regenerating the powdered catalyst and partially regenerating the granular catalyst, separating the regenerated powdered catalyst from the partially regenerated granular catalyst, and returning both catalysts to the system without further regeneration of the granular catalyst.

7. In a hydrocarbon conversion system wherein powdered catalyst material comprising a metal oxide is employed for converting hydrocarbon charging stock into high quality motor fuel and is then regenerated with an oxygen-containing gas for the removal of carbonaceous deposits therefrom, the method of removing catalyst fines from a gaseous stream in which said catalyst fines are suspended, which method comprises introducing a gaseous stream containing suspended catalyst fines into a bed of granular material whereby the granular material acts as a filter for recovering powdered catalyst fines from said gaseous stream, removing granular material together with accumulated catalyst fines from the gaseous stream, separating catalyst fines from the removed granular material by means of another gaseous stream and returning the granular material from which catalyst fines have been separated into contact with the first-named gaseous stream for the recovery of additional catalyst fines.

8. The method of claim 7 wherein the gaseous stream containing catalyst fines is continuously introduced into a moving bed of granular material, wherein granular material and catalyst fines are continuously removed from the bottom of said moving bed and continuously suspended in another gaseous stream, wherein the catalyst fines are continuously removed from the granular material and wherein the granular material which is free from catalyst fines is continuously added to the top of said moving bed.

9. The method of regenerating a mixture of powdered and granular catalyst material which has been coated with carbonaceous deposits, which method comprises suspending a mixture of coated powdered and granular catalyst material in an oxygen-containing gas and burning carbonaceous deposits from said material in a primary combustion zone while it is in gaseous suspension, introducing the suspended material from the primary combustion zone into a secondary combustion zone, removing powdered material together with a gaseous stream from the top of said secondary combustion zone and removing granular catalyst material from a low point in said secondary combustion zone.

JAMES M. PAGE, Jr.